2,899,406
N-(VINYLOXYALKYL) ACYLAMIDOGUANA-MINES, METHOD OF MAKING SAME, AND COPOLYMERS THEREOF

Peter L. De Benneville and Leo S. Luskin, Philadelphia, Pa., assignors to Rohm & Haas Company, Philadelphia, Pa., a corporation of Delaware No Drawing. Application November 29, 1955
Serial No. 549,852

16 Claims. (Cl. 260—47)

This invention is concerned with novel vinyl ethers, polymers and copolymers thereof, and with processes for their production. It is particularly concerned with the production of N-(vinyloxyalkyl)acylamidoguanamines.

The N-(vinyloxyalkyl)acylamidoguanamines of the present invention have the structure of one of Formulas I, II, and III as follows:

(I) 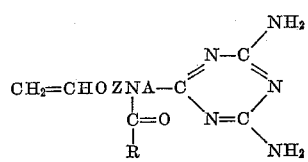

(II) 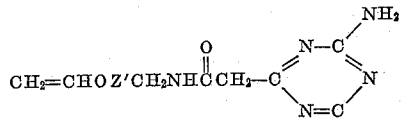

(III) 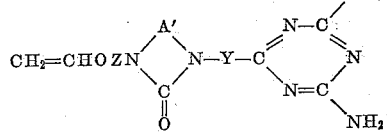

where Z is an alkylene group having 2 to 6 carbon atoms, the oxygen and the nitrogen being attached to different carbons thereof, A is selected from the group consisting of —CH$_2$CH$_2$—, —CH(CH$_3$CH$_2$—, and —CHR'— where R' is hydrogen or an alkyl group having 1 to 8 carbon atoms, R is selected from the group consisting of H, alkyl groups having 1 to 18 carbon atoms, aryl groups having 6 to 10 carbon atoms, including phenyl, naphthyl, alkylphenyl in which the alkyl group has 1 to 4 carbon atoms, halogenated phenyl and naphthyl groups, especially those containing chlorine or bromine, benzyloxy, and alkoxy and alkoxyalkyl groups of the formulas R$^3$O— and R$^3$OR$^4$— where R$^3$ is an alkyl group having 1 to 4 carbon atoms and R$^4$ is an alkylene group having 1 to 4 carbon atoms; with the proviso that when R is H, the two carbon atoms in A and Z that are attached directly to the N atom therebetween each carry two hydrogen atoms, Z' is an alkylene group having 1 to 5 carbon atoms, A' is selected from the group consisting of —CH$_2$CH$_2$—, —(CH$_2$)$_3$—, —CH$_2$CH(CH$_3$)—, and —CH(CH$_3$)CH$_2$—, and Y is selected from the group consisting of —CH$_2$CH$_2$—, —CH$_2$CH(CH$_3$)—, and —CH(CH$_3$)CH$_2$—.

These guanamines of Formulas I, II, and III are obtained by the reaction of dicyandiamide of the formula

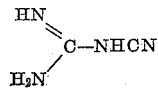

with a nitrile of one of Formulas IV, V, and VI respectively:

(IV) 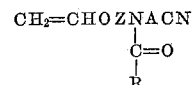

(V) 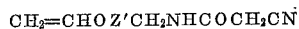

(VI) 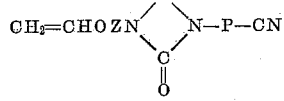

where the symbols are as defined before.

The reaction of the nitrile of one of Formulas IV, V, and VI with dicyandiamide may be effected in a suitable inert solvent, such as methanol, ethanol, propanol, isopropanol, n-butanol, sec-butanol, t-butanol, methoxy-ethanol, ethoxyethanol, and glycols, such as ethyleneglycol, diethyleneglycol, and so on. The reactants may be used in approximately equimolar amount, but generally it is preferable to provide 20% to 30% excess of the dicyandiamide (on a molar basis). From about 200 to 500 grams of solvent may be used per gram-mole of the nitrile. Generally, only a part of the reactants dissolve in the solvent so that a portion thereof is present in undissolved condition. The slurry of the reactants in the solvent is heated to reflux, a solvent being preferably employed which will provide a temperature of reflux between 75° and 120° C. As a catalyst, an alkali metal hydroxide, an alkali metal alkoxide, or quaternary ammonium bases may be employed. From 10 to 40 mole percent of the catalyst may be employed based on the weight of nitrile reactant. The hydroxides or the methoxides, ethoxides, or propoxides of sodium or potassium may thus be employed, or such quaternary ammonium bases as benzyltrimethylammonium hydroxide may be employed. The catalyst may be dissolved in a portion of the solvent before it is added to the main reaction mixture; and the catalyst solution thus prepared may be added gradually to the reaction mixture at the elevated temperature thereof between 75° and 120° C. during refluxing. For example, the catalyst mixture may be added over a period of 15 minutes or one hour or more depending on the size of the batch. After the completion of the addition of the catalyst, the batch may be refluxed for a period of 3 to 8 hours or more, again depending upon the size of the batch. After completion of the reaction, the mixture is allowed to cool. The solid product of Formulas I, II, or III may start to separate during reaction or during the cooling. Any such separated solid product may be recovered by filtration, washing with alcohol or water, and drying. If no separation occurs, the solvent or solvents may be evaporated leaving the product as a residual solid, which may be washed with warm water and then dried. Optionally, the product thus obtained may be recrystallized for purification.

The products of Formulas I, II, or III are generally solids having sharp melting points in the range of about 100° to 210° C. and up. They are generally insoluble in water and hydrocarbons, although some are soluble in hot water and hot lower alcohols, such as methanol and ethanol. They are generally soluble in dimethylformamide even at room temperature and some of them are soluble in esters, such as ethoxyethyl acetate. Generally, the more branched the character of the alkylene group A, the more soluble the product is in all types of solvents. The compounds of Formula III are generally characterized by less solubility than those of Formulas I and II. The compounds of Formulas I, II, and III are generally quite stable under normal conditions of temperature and humidity.

As described in our copending application Serial No. 549,851, filed on even date herewith, now Patent No. 2,833,751, which claims the nitriles of Formula IV and their preparation, the nitriles of Formula IV are obtained by the acylation of an aminonitrile of the Formula VII:

(VII)   $CH_2=CHOZNHACN$ where Z and A are as defined above. These aminonitriles are obtained by reacting an aminoalkyl vinyl ether of Formula VIII:

(VIII)   $CH_2=CHOZNH_2$ with a member selected from the group consisting of glycolonitrile and aldehyde cyanohydrins of the Formula IX:

(IX)
$$\begin{array}{c} H \\ | \\ R'C-CN \\ | \\ O \\ | \\ H \end{array}$$

R' being as defined above, also acrylonitrile, methacrylonitrile, and crotononitrile.

Examples of the vinyl ethers of Formula VIII include:

$CH_2=CHO(CH_2)_6NH_2$
$CH_2=CHOCH_2CH_2NH_2$
$CH_2=CHOCH_2CH_2CH_2NH_2$
$CH_2=CHOCH_2CH(CH_3)NH_2$
$CH_2=CHOCH(CH_3)CH_2NH_2$
$CH_2=CHOCH_2C(CH_3)_2NH_2$
$CH_2=CHOC(CH_3)_2CH_2NH_2$
$CH_2=CHOCH_2CH_2CH_2CH_2NH_2$
$CH_2=CHOC(CH_3)_2CH_2CH(CH_3)NH_2$
$CH_2=CHOCH_2C(CH_3)_2CH_2NH_2$

Examples of cyanohydrins are those of formaldehyde, acetaldehyde, propionaldehyde, butyraldehyde, valeraldehyde, caproaldehyde, caprylaldehyde, and pelargonaldehyde, etc.

The reaction between the cyanohydrin and the amine of Formula VIII may be carried out in the absence of a solvent, but is generally effected in the presence of water or in non-reactive solvents, such as benzene, toluene, xylenes, petroleum ether, ether, diisopropyl ether, dibutyl ether, dioxane, ethanol, methanol, isopropanol, etc. The amine of Formula VIII and the cyanohydrin are preferably employed in equimolar or substantially equimolar amounts. Instead of introducing a preformed cyanohydrin into the solution of the amine, the cyanohydrin may be prepared in situ in the reaction medium in the presence of the amine of Formula VIII by the addition of equimolar amounts of hydrogen cyanide and an aldehyde. The cyanohydrin is produced rapidly and then reacts with the amine. The reaction is effected at a temperature of 0° to 50° C. It is exothermic in character and may take various periods of time depending on the particular temperature and the particular reactants. Generally, 4 to 24 hours' standing is adequate. Water is split out as a by-product of the reaction, and the aminonitrile product of Formula VII is recovered from the reaction mixture by the addition of a solvent that is immiscible with water, such as benzene, toluene, xylenes, chloroform or other low-boiling chlorinated solvents. The water layer is removed and the remaining layer consisting of the solution of the product in benzene or other solvent may be dried over a suitable dehydrating agent, such as magnesium sulfate, sodium sulfate, or calcium chloride. After distilling off the solvent, the product remains. Many of the products are distillable and may be purified in this manner.

In the reaction of the amine of Formula VIII with an unsaturated nitrile, specifically acrylonitrile, methacrylonitrile, and crotononitrile, the reactants are utilized in equimolar or substantially equimolar amounts, although an excess of either may be present. The use of solvents for this reaction is optional. If desired, such solvents may be used as t-butanol, acetonitrile, nitromethane, and chlorinated solvents, such as chloroform, carbon tetrachloride, and ethylene dichloride. If desired, an excess of the amine of Formula VIII may be used as a solvent. The reaction may be effected at a temperature from room temperature (e. g., 15° C.) up to 100° C. The mixture of reactants may be allowed to stand for 4 to 48 hours, or they may be heated to temperatures up to 100° C. to hasten the reaction so that it may be completed within a period of 3 to 8 hours. After completion of the reaction, the solvents are distilled off and the product may be purified in any suitable manner, if necessary or desired.

In order to produce the compounds of Formula IV, the amine nitrogen of an aminonitrile of Formula VII is acylated. This may be effected in a number of ways depending on the acyl group to be introduced.

(1) Compounds of Formula IV in which R is an alkyl group having 1 to 17 carbon atoms, an alkoxyalkyl group of the formula $R^3OR^4$, or an aryl group having 6 to 10 carbon atoms, including phenyl, naphthyl, alkylphenyl, chlorophenyl, bromophenyl, etc. may be made by reacting the aminonitrile of Formula VII with an acyl halide of the formula RCOX, where X is selected from the group consisting of chlorine and bromine. Examples of the acyl halides include acetyl chloride and bromide, propionyl chloride and bromide, butyryl chloride, valeryl chloride, lauroyl chloride, myristyl chloride, palmityl chloride, stearoyl chloride or bromide, benzoyl chloride, toluoyl chloride, 2,4-dimethyl-benzoyl chloride, naphthoyl chloride, p-chloro-benzoyl chloride, methoxy-acetyl chloride, ethoxyacetyl chloride, butoxy-acetyl chloride, α-ethoxy-propionyl chloride, β-ethoxy-propionyl chloride, γ-butoxy-butyryl chloride, etc.

This reaction of the aminonitrile of Formula VII with the acyl halide is carried out at a temperature from 0° to 100° C. and preferably at room temperature or in the range of 15° to 40° C. A basic compound for accepting the hydrogen halide liberated by the reaction is introduced into the mixture of reactants and, for this purpose, any tertiary amine is suitable. Examples of such tertiary amines include trimethylamine, triethylamine, pyridine, triethanolamine, benzyldimethylamine and N,N-dimethylaniline. Depending upon the particular reactants and especially the particular acyl halide which may be either a bromide or a chloride, cooling may be needed to keep the reaction within the temperature range desired, or, on the other hand, heat may be needed to raise it to the desired temperature. With many of the acyl halides, the reaction is preferably kept below 40° C. but with sluggish acyl chlorides or with hindered amines of Formula VII it may be necessary to heat the reaction mixture up to 100° C. in order to obtain completion thereof in a reasonable time. The reaction may be effected in the presence of excess amine as the solvent or in any other non-aqueous medium. Inert solvents, such as benzene, toluene, or xylenes, may be employed. Unless excess amine is desired to serve as the solvent or part of the solvent, the acyl halide and the aminonitrile are employed in substantially equimolar proportions or with a slight excess of the aminonitrile. In order to isolate the product, the reaction mixture is filtered to remove the hydrogen halide salt of the amine. It is then distilled to remove solvent leaving the product which, if desired, may be distilled for purification.

(2) Compounds of Formula IV in which R is benzyloxy or an alkoxy group $R^3O$ are obtained when an aminonitrile of Formula VII is reacted with benzyl chloroformate or an alkyl chloroformate of the formula $ClCOOR^3$ in which $R^3$ may be methyl, ethyl, propyl, isopropyl, or butyl.

In this reaction, the chloroformate and the aminonitrile of Formula VII are preferably used in substantially equimolar proportions and the reaction is effected in aqueous medium. At least one mole of a hydrogen halide acceptor, such as alkali metal bicarbonates, carbonates, or hydroxides, such as those of lithium, and especially sodium or potassium, is used for each mole of chloroformate used in the reaction. The reaction is exothermic and occurs at a temperature of 0° to 50° C. quite readily. Conveniently, room temperature is employed, no heat being required. However, it may be necessary to control the temperature below the 50° C. limit either by cooling or by controlling the rate of addition of one reactant to the other. Instead of using the inorganic acceptors for hydrogen halide, tertiary amines such as those mentioned hereinabove may be used for this purpose. The reaction in any event is vigorous and may be allowed to occur over a period of one hour to twenty-four hours. Generally, the reaction mixture separates into aqueous and organic layers. Any part of the compound of Formula IV present in the water layer may be extracted therefrom with an immiscible solvent, such as benzene, toluene, chloroform, and ethylene dichloride. The extracts are added to the oil layer and the combined mixture thereby obtained is dehydrated, such as by means of magnesium sulfate, sodium sulfate, calcium chloride. The solvent is distilled off leaving the product which may be easily purified by distillation.

(3) Compounds of Formula IV in which R is H or $CH_3OCH_2$—and in which those carbon atoms of groups Z and A, which are attached directly to the nitrogen, are unsubstituted may be obtained by reacting an aminonitrile of Formula VII with an alkyl formate, especially methyl formate, or with an alkyl ester, especially the methyl ester, of methoxyacetic acid. Although the methyl esters are preferred, the alkyl group may have from 1 to 4 or more carbon atoms.

In this third procedure, it is essential that the carbons of group Z and A, which are directly connected to the nitrogen in Formula IV, each carry two hydrogen atoms. Except for this limitation, any aminonitrile of Formula VII will react with an alkyl formate and especially methyl formate or with an alkyl ester of methoxyacetic acid, especially the methyl ester. The reaction is effected under anhydrous conditions. It may be effected using excess of the formate or methoxyacetate as a part of the solvent. For example, it is generally most practical to employ from 1.5 to 3 or more moles of the ester per mole of the aminonitrile of Formula VII. Anhydrous solvents, such as dimethylformamide, dimethylacetamide, benzene, toluene, xylene, and ketones, such as acetone, methylethyl ketone, and dioxane, are suitable. The solvent may be selected to enable higher temperature to be employed to accelerate the reaction. Depending upon the particular ester, various temperatures may be employed from about 40° C. up to about 140° C.; for example, in using methyl formate, a temperature of 40° to 50° C. for about 4 to 16 hours is quite satisfactory, the temperature being obtained by heating the reaction mixture to reflux. In the case of methyl methoxyacetate, refluxing at 130° C. for about 8 to 12 hours is a suitable procedure. When higher temperatures are employed, the alcohol (methanol in the case of the methyl esters) is continuously distilled off during refluxing operation. At the completion of the reaction, excess formic or methoxyacetic acid ester is distilled off as well as any alcohol remaining, such as methanol. This leaves the product which may be purified further if desired but is sufficiently pure for many purposes.

The amidonitriles of Formula IV are generally liquids or waxy solids which are of generally low-melting points. Some of the products are distillable, though in many cases extreme low pressure or care has to be used. The products are generally insoluble or have a low solubility in water. Many of them are soluble in such solvents as the ethoxyethyl acetate, acetone, acetonitrile, dimethylformamide, dimethylacetamide, and dioxane.

The compounds of Formula V may be obtained by reacting a lower alkyl ester of cyanoacetic acid of the Formula X:

(X)  $NCCH_2COOR^0$ where $R^0$ is a lower alkyl group having 1 to 4 carbon atoms and is preferably methyl, with a compound of Formula XI:

(XI)  $CH_2=CHOZ'CH_2NH_2$

This aminolysis may be effected in any inert solvent such as benzene, toluene, xylenes, acetonitrile, or any alcohol such as ethanol, isopropanol, or n-butanol. It is effected at a temperature between about 0° and 40° C. A temperature of room temperature to 40° C. is in general preferred. Generally, the reaction is relatively slow and it is merely necessary to mix the reactants in the solvent and let the solution thereby obtained stand at the temperature desired until the reaction is complete. The reactants are generally mixed in equimolar proportions and the completion of the reaction is readily determined by testing for the amine by titration. The reaction is complete when the amine has disappeared by this test. A time of 24 hours to three weeks may be employed. At the end of the reaction, the solvent is removed by distillation at as low a temperature as possible and preferably at reduced pressures, for example at absolute pressures of 20 mm. of mercury or higher so as to keep the maximum temperature of the batch below 40° C. The residue remaining is the product of Formula V which is generally obtained in a quantitative yield.

The compounds of Formula VI are the invention of Newman M. Bortnick, Serial No. 626,294, filed December 5, 1956, in the hands of a common assignee and are obtained by reacting a compound of Formula XII:

(XII) 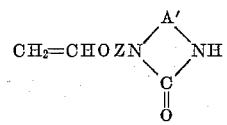

with a member selected from the group consisting of acrylonitrile, methacrylonitrile, and crotononitrile. In this case, the reactants are utilized in equimolar or substantially equimolar amounts although an excess of either may be present. The use of solvents is optional. If desired, such solvents may be used as t-butanol, acetonitrile, nitromethane and chlorinated solvents as chloroform, carbon tetrachloride and ethylene dichloride. A catalyst is used and, for this purpose, an alkali metal hydroxide or alkoxide, such as sodium or potassium hydroxide, methoxide or ethoxide may be used; or quaternary ammonium hydroxides may be used, such as benzyltrimethylammonium hydroxide. One of the reactants or the catalyst (dissolved in a solvent) may be added gradually to the reaction vessel in order to control the reaction temperature because of the exothermic nature thereof. The temperature may be from room temperature up to 100° C.

The monomeric compounds of Formulas I, II, and III are substituted guanamines which are useful as corrosion inhibitors as in pickling baths. They are useful chemical intermediates since they are reacted with many other compounds. For example, they may be reacted with aldehydes, especially formaldehyde or its revertible polymers, to produce methylolated compounds which are useful as components of coating resins, adhesives, molding resins and so on. Besides producing polymethylol derivatives by the reaction with formaldehyde, the reaction with such aldehyde may be effected in the presence of lower alcohols producing polyalkoxymethyl derivatives of water-soluble character which are also useful as coating resins, adhesives and molding resins. The water-soluble polymethylol and polyalkoxymethyl derivatives are useful as components for adhesives for paper, for making plywood, for leather, for plaster and many other materials. They may be admixed with other aminoplast pre-condensates of water-soluble character, such as those of urea/formaldehyde, melamine/formaldehyde and the like. Water-soluble polymethylol and polyalkoxymethyl derivatives of the compounds of Formulas I, II, and III may be used as molding resins in dry-powdered form, especially in conjunction with such fillers as alpha cellulose, wood fibers, rag fibers, cotton, cellophane clippings, and pigments. The compounds of Formulas I, II, and III, and especially those in which Z or Z' are of 5- and 6-carbon atom links, may be reacted with alkylene oxide, such as ethylene oxide or a mixture of ethylene oxide with propylene oxide to render them more readily water-dispersible. Such alkylene oxide condensates are useful as a component of built detergents, as foam stabilizers for soaps and other detergent solutions and so on.

By virtue of the vinyl unsaturation in the compounds of Formulas I, II, and III, they are capable of undergoing addition polymerization for the formation of copolymers containing from 1% to 50% by weight of one of the new compounds. Preferably, copolymers are obtained containing 1% to 10% by weight of one or more of the new compounds with 90% to 99% by weight of a comonomer of the type described hereinbelow. Such copolymers are adapted to be cured to an insoluble, infusible condition by means of aldehydes, especially formaldehydes, or solutions of aldehydes in alcohol. This curing may be effected at elevated temperatures under acid conditions. The copolymers whether used with or without aldehyde curing are advantageous in the preparation of coatings, adhesives, and finishes for textiles, paper, leather, and the like.

For the copolymerization, azo catalysts may be used when the copolymerization is effected in bulk, or in solvents, such as ethoxyethyl acetate, cyclohexanol, dimethylformamide or mixtures of solvents, such as xylene and butanol. Copolymerization may also be effected in aqueous emulsion or suspension systems with azo catalysts or with a redox system, such as may be obtained when ammonium or an alkali metal persulfate is employed with an alkali metal hydrosulfite or other reducing agent.

Examples of azo catalysts include azodiisobutyronitrile, dimethyl azodiisobutyrate and the like. Other monoethylenically unsaturated compounds that may be copolymerized with compounds of Formulas I, II, and III which have been found of interest include esters of acrylic acid, such as methyl acrylate, ethyl acrylate, butyl acrylate, 2-ethylhexyl acrylate, 3,5,5-trimethylhexyl acrylate, dodecyl acrylate, ethoxyethyl acrylate, butoxyethyl acrylate, phenoxyethyl acrylate, cyclohexyl acrylate, benzyl acrylate, and the like, acrylamides, acrylonitrile, methacrylonitrile, esters of methacrylic acid including methyl, ethyl, propyl, butyl, hexyl, octyl, dodecyl, cetyl, ethoxyethyl, butoxyethyl, cyclohexyl, benzyl, and dimethylaminoethyl methacrylates.

In the examples, which are illustrative of the invention, the parts given are by weight unless otherwise indicated:

Example 1

A solution of 4.4 grams of 85% potassium hydroxide in isopropanol (65 grams) is added in 1 hour to a slurry of β-[N-(β-vinyloxyethyl)formamido]-propionitrile (37 grams) and dicyandiamide (21.8 grams) with isopropanol (35 grams) while the slurry is stirred and heated under reflux at 90° C. Heating and stirring is continued for 6 hours. The reaction mix is allowed to cool overnight. The product is collected on a Buchner funnel, washed with isopropanol and dried to give 49.8 grams (a 90% yield) of a light-tan solid, M.P. 138° to 140° C.

*Analysis.*—Calculated for $C_{10}H_{16}N_6O_2$: N, 33.4%. Found: N, 33.4%.

Decolorization with activated charcoal and recrystallization from boiling water gives β-[N-(β-vinyloxyethyl)-formamido]-propioguanamine as a white product, M.P. 145° to 146° C.

Example 2

(a) α-[N-(β-vinyloxyethyl)acetamido]-acetonitrile (37.0 grams) is treated exactly as in Example 1. The reaction mixture becomes clear and the product begins to be deposited during the reaction period. The cooled, almost solid mass is washed on a funnel with isopropanol and dried to give 50.3 grams (a 92% yield) of α-[N-(β-vinyloxyethyl)acetamido]-acetoguanamine as a light tan solid, M.P. 167° to 168° C.

*Analysis.*—Calculated for $C_{10}H_{16}N_6O_2$: N, 33.4%. Found: N, 32.6%.

(b) α-[N-(β-vinyloxypropyl)acetamido]-acetoguanamine is similarly prepared from α-[N-(β-vinyloxypropyl)acetamido]-acetonitrile.

(c) β-[N-(γ-vinyloxypropyl)formamido]-propioguanamine is similarly prepared from β-[N-(γ-vinyloxypropyl)formamido]-propionitrile.

(d) β-[N-(5-vinyloxypentyl)acetamido]-propioguanamine is similarly prepared from β-[N-(5-vinyloxypentyl)acetamido]-propionitrile.

(e) α-[N-(β-vinyloxyethyl)-β-ethoxy-propionamido]-acetoguanamine is similarly prepared from α-[N-(β-vinyloxyethyl)-β-ehtoxy-propionamido]-acetonitrile.

Example 3

A slurry of α-[N-ethoxycarbonyl-N-(β-vinyloxyethyl)-amino]-isovaleronitrile (105.5 grams, 0.44 mole), dicyandiamide (44.5 grams, 0.53 mole) and isopropanol (50 grams) is heated to reflux. A solution of 8.6 grams (0.13 mole) of 85% KOH in isopropanol (65 grams) is added in 15 minutes. The slurry dissolves, then begins to become turbid. The mixture is heated for 6 hours. After standing overnight, the product is collected and washed with isopropanol. Drying at 60° C. gives 107 grams of a white solid, M.P. 135° to 137° C. insoluble in water, but soluble in cold acetone, methanol and dimethylformamide. The solubility in ethoxyethylacetate at 80° C. is about 10%.

Recrystallization of 60 grams from isopropanol gives 46 grams of α-[N-ethoxycarbonyl-N-(β-vinyloxyethyl)-amino]-isovaleroguanamine, M.P. 140° to 141° C. The solubility of this material is at least 10% in ethoxyethyl acetate at room temperature, 50% at 80° C. in ethoxyethyl acetate, at least 20% in methyl methacrylate and in 1:1 (weight ratio) methyl methacrylate-xylene and 3–4% in xylene at 80° C.

*Analysis.*—Calculated for $C_{14}H_{24}N_6O_3$: N, 25.9%. Found: Crude material, N, 25.6%. Recrystallized, N, 25.8%.

Example 4

(a) A similar reaction by the procedure of Example 3 of β-[N-(β-vinyloxyethyl)propionamido]-propionitrile (24.9 grams, 0.127 mole, M2–324), dicyandiamide (12.8 grams, 0.152 mole), 85% KOH (2.5 grams, 0.04 mole) and isopropanol (50 grams) gives a clear solution from which solid begins to separate after 1 hour. Filtration and evaporation give 2 crops, 5.5 grams, M.P. over 250° C. N, 28.2% and 6 grams, M.P. 148° to 150° C., N, 31.7%. The residual solid is recrystallized from water (40 ml.) to give 10 grams, M.P. 162° to 163° C., N, 31.5%. The last two crops are recrystallized from water, giving 9.3 grams, M.P. 165° to 167° C., N, 31.8% (calc. 30.0).

(b) α-[N-benzyloxycarbonyl-N-(β-vinyloxyethyl)]-isovaleroguanamine is similarly prepared from α-[N-benzyloxycarbonyl-N-(β-vinyloxyethyl)]-isovaleronitrile.

Example 5

A similar reaction by the procedure of Example 3 of N-(β-vinyloxyethyl)formamidoacetonitrile (32 grams, 0.2 mole), dicyandiamide (19.1 grams, 0.23 mole), KOH (2.1 grams, 0.03 mole) and isopropanol (100 ml.) gives a very thick slurry to which 50 ml. of isopropanol is added to ease stirring. The tan solid is collected (42.5 grams) and recrystallized from water (200 ml.). The white solid product, α-[N-(β-vinyloxyethyl)-formamido]-acetoguanamine, M.P. 194° to 196° C. weighs 19 grams.

Example 6

85% potassium hydroxide (9.3 grams) dissolved in isopropanol (75 grams) is added slowly to a slurry of α-[N-(β-vinyloxyethyl)benzamido]-propionitrile (111 grams) and 84 g. (1 mole) of dicyandiamide in 100 cc. of isopropanol while stirring and heating under reflux. The product begins to precipitate during the heating period and after 6 hours, the mixture is solid. The product is washed with isopropanol on a funnel and dried to give 107 grams (a 72% yield) of α-[N-(β-vinyloxyethyl)benzamido]-propioguanamine as a white solid, M.P. 190° to 193° C.

Analysis.—Calculated for $C_{16}H_{20}N_6O_2$: N, 25.6%. Found: N, 25.5%.

Example 7

(a) A solution of 85% potassium hydroxide (5 grams) in isopropanol (65 grams) is slowly added to a slurry of β-[N-(β-vinyloxyethyl)benzamido]-propionitrile (59.5 grams) and dicyandiamide (24.4 grams) in isopropanol (35 grams) stirred under reflux. Heating is continued for 6 hours. The reaction mixture is cooled in an ice bath and the product, β-[N-(β-vinyloxyethyl)benzamido]-propioguanamine, a tan solid, is collected in 2 crops, which, after drying, weigh 31.9 grams, M.P. 160° to 165° C. Recrystallization from water gives a slightly colored solid, M.P. 156° to 158° C.

Analysis.—Calculated for $C_{16}H_{20}N_6O_2$: N, 25.6%. Found: N, 25.1%.

(b) β-[N-(β-vinyloxyethyl) - p - methylbenzamido]-propioguanamine is similarly prepared from β-[N-(β-vinyloxyethyl)-p-methylbenzamido]-propionitrile.

Example 8

Potassium hydroxide (3.3 grams) in 50 grams of isopropanol is slowly added to a slurry of β-[N-(β-vinyloxyethyl)-palmitamido]-propionitrile (54.9 grams) and dicyandiamide (16.4 grams) in isopropanol (30 grams) while stirring and refluxing. Heating is continued for 12 hours. The cooled mix is filtered, redissolved in isopropanol and filtered hot. The filtrate, on cooling, deposited the product, β-[N-(β-vinyloxyethyl)palmitamido]-propioguanamine as a white solid which is dried on a porous plate to give 44 grams (a 63% yield). After recrystallization from alcohol, the solid has a M.P. of 112° to 115° C.

Analysis.—Calculated for $C_{25}H_{46}N_6O_2$: N, 18.1%. Found: N, 18.3%.

This compound produces a water-repellent finish when rubbed on shoes, boots and other leather goods.

Example 9

A solution of potassium hydroxide (5 grams) in isopropanol (65 grams) is slowly added to a mixture of α-[N-(β-vinyloxyethyl)-N-(ethoxycarbonyl)amino]-acetonitrile (49.5 grams), dicyandiamide (25.2 grams) and isopropanol (35 grams) while being stirred and heated under reflux. The whole is heated for 6 hours. After cooling, the product, α-[N-(β-vinyloxyethyl)-N-(ethoxy-carbonyl)amino]-acetoguanamine, is collected on a Büchner funnel and washed with ice water. After drying, it weighs 59 grams (an 84% yield), M.P. 147° to 149° C.

Analysis.—Calculated for $C_{11}H_{18}N_6O_3$: N, 29.8%. Found: N, 29.5%.

Example 10

α - [N - (β - vinyloxyethyl) - N - (ethoxycarbonyl)amino]-propionitrile (53 grams) is treated exactly the same as in Example 9 to give 59 grams (an 80% yield) of α-[N-(β-vinyloxyethyl)-N-(ethoxycarbonyl)amino]-propioguanamine, a white solid, M.P. 140° to 142°.

Analysis.—Calculated for $C_{12}H_{20}N_6O_3$: N, 28.4%. Found: N, 27.7%.

Example 11

Potassium hydroxide (5.3 grams) in isopropanol (65 grams) is similarly (as in Example 9) added to ethyl N-(β-vinyloxyethyl) - N - (β-cyanoethyl)carbamate (54.8 grams), dicyandiamide (26 grams) and isopropanol (35 grams) to give 71.8 grams (a 93% yield) of β-[N-(β-vinyloxyethyl) - N - (ethoxycarbonyl)amino] - propioguanamine as a white solid, M.P. 134° to 136° C.

Anaylsis.—Calculated for $C_{12}H_{20}N_6O_3$: N, 28.4%. Found: N, 28.5%.

Example 12

(a) The addition of β-aminoethyl vinyl ether (43.5 grams, 0.5 mole) to methyl cyanoacetate (49.5 grams, 0.5 mole) is accompanied by the evolution of considerable heat which ceases after the addition of methanol (100 ml.). After standing 2 weeks, solvent is removed under reduced pressure to give 78 grams (calc. 77 grams) of N-β-vinyloxyethylcyanoacetamide as a red, viscous residue, $n_D^{25}$ 1.5242.

(b) N-(β-vinyloxyethyl)cyanoacetamide (38.5 grams, 0.25 mole), dicyandiamide (25.2 grams, 0.3 mole), KOH (5 grams, 0.075 mole) and isopropanol (100 grams) reacted by the procedure of Example 3, gives a yellow slurry. The product is collected and dried. The light-tan solid containing 2-[N-(β-vinyloxyethyl)carbamylmethyl]-4,6-diamino-1,3,5-triazine weighs 27 grams, M.P. 152° to 153° C., N, 37.4%. Recrystallization from water gives 11 grams of a light-tan solid, M.P. 180° to 182° C., N, 35.9% (calc. 35.2%).

(c) 2 - [N - (6 - vinyloxyhexyl)-carbamylmethyl]-4,6-diamino-1,3,5-triazine is prepared by the procedure of part (b) from N-(6-vinyloxyhexyl)cyanoacetamide prepared by the procedure of part (a) from 6-aminohexyl vinyl ether and methyl cyanoacetate.

Example 13

(a) Acrylonitrile (74 grams) is added over a period of 15 minutes to N-(β-vinyloxyethyl)-N,N'-ethyleneurea (202 grams) containing 2 grams of sodium methylate. The temperature rises from 21° to 81° C. at the end of the addition. After exothermic action subsides, the catalyst is neutralized with an equivalent amount of 85% phosphoric acid. Distillation gives 214 grams (an 80% yield) of 1-(β-vinyloxyethyl)-3-(β-cyanoethyl)-imidazolidinone-2 as a viscous liquid, boiling in the range 166° to 168° C./0.2 mm. Hg, $n_D^{25}$ 1.4972.

Analysis.—Calculated for $C_{10}H_{15}N_3O_2$: N, 20.1%. Found: N, 20.0%.

(b) Potassium hydroxide (5 grams) in isopropanol (65 grams) is added to 52.3 grams of the product of part (a) hereof, 25.2 grams of dicyandiamide and 35 grams of isopropanol and reaction is effected as in Example 9. The white product 1-(β-vinyloxyethyl)-3-(β-guanaminoethyl)-imidazolidinone-2 weighs 69 grams (a 94% yield), M.P. 191° to 193° C.

Analysis.—Calculated for $C_{12}H_{19}N_7O_2$: N, 33.4%. Found: N, 33.3%.

Example 14

(a) By the procedure of part (a) of Example 13, crotononitrile is reacted with N-(β-vinyloxyethyl)-N,N'-trimethyleneurea producing 1-(β-vinyloxyethyl)-3-(β-cyanoisopropyl)-tetrahydro-2-pyrimidinone.

(b) By the procedure of Example 13 (b), the product of part (a) of this example is reacted with dicyandiamide producing 1-(β-vinyloxyethyl)-3-(β-guanaminoisopropyl)-tetrahydro-2-pyrimidinone.

Example 15

(a) By the process of Example 13 (a), methacrylonitrile is reacted with 1-(5-vinyloxypentyl)-4-methylimidazolidinone-2 producing 1 - (5 - vinyloxypentyl) - 4-methyl-3-(β-cyanopropyl)-imidazolidinone-2.

(b) By the procedure of Example 13 (b), the product of part (a) hereof is reacted with dicyandiamide producing 1-(5-vinyloxypentyl)-4-methyl-3-(β-guanaminopropyl)-imidazolidinone-2.

*Example 16*

A one liter, four-necked flask is equipped with a stirrer, condenser and separatory funnel and thermometer. The entire charge consisting of the following materials is put into the flask:

| | Grams |
|---|---|
| Acrylonitrile | 12.4 |
| Methyl methacrylate | 205.0 |
| α-[N - (β - vinyloxyethyl) - N - (ethoxycarbonyl)-amino]-acetoguanamine | 32.3 |
| Ethoxyethyl acetate | 305.0 |
| Azodiisobutyronitrile | 1.2 |

Stirring is started, and, under an atmosphere of nitrogen, the mixture is heated to 80° C. where it becomes almost clear. The polymerization is held between 80° and 82° C. for three hours. The mixture is then recatalyzed with 0.2 gram azoisobutyronitrile in 35 grams ethoxyethyl acetate. Two hours after the first recatalysis the mixture is again recatalyzed in the same manner. Stirring and heating are continued for an additional two hours—total reaction time 7 hours. After standing overnight the polymer solution is cut to 35% solids with an additional 80 grams of ethoxyethyl acetate. Supercel is added and the mixture is filtered at 90° C. and 40 p.s.i. in a pressure filter. There is obtained 637 grams (a 93% yield) of copolymer as an almost colorless resin having a Gardner-Holdt viscosity of Z-2 at 36.4% solids. Portions of this copolymer solution is cast on various supports, including wood, steel, and paper and formed hard films on drying which were of thermoplastic character. Another portion of the copolymer solution is mixed with a butanol-formaldehyde solution, 0.5% of ammonium chloride is added as an acid catalyst, and the resulting solution is coated on panels of metal and baked at 150° C. for 30 minutes, yielding hard, glossy, solvent-resistant and infusible coatings.

*Example 17*

A mixture of 64.8 grams of α-[N-ethoxycarbonyl-N-(β-vinyloxyethyl)amino]-isovaleroguanamine, 20.5 grams of acrylonitrile, 342 grams of methyl methacrylate, 500 grams of ethoxyethyl acetate, and 2.14 grams of azodiisobutyronitrile is copolymerized at 90° C. for 8 hours. The copolymer solution on dilution to 42% solids has a Gardner-Holdt viscosity of Z-6. Thermoplastic coatings are formed of this copolymer on glass, metal, and wood panels.

*Example 18*

(a) 50 parts by weight of butyl acrylate and 50 parts by weight of the product of Example 8 are emulsified in 250 parts of water while agitating my means of 6 parts of a surface active t-octylphenoxypolyethoxyethanol, and the emulsion is cooled to about 15° C. Then 0.15 part of ammonium persulfate and 0.17 part of diethylenetriamine are added with stirring. Copolymerization is accompanied by a rise in temperature, yielding an aqueous dispersion of the copolymer. The application of this copolymer to textiles, especially wool, paper and leather, produces a water-repellent, flexible finish thereon.

(b) Aqueous dispersions of copolymers similarly obtained from 35 parts of lauryl acrylate and 65 parts of a respective one of the products of Examples 12(c) and 15(b) are applied to textiles, paper, and leather with similar results.

*Example 19*

Aqueous dispersions are formed by the procedure of part (a) of Example 18 from:

(1) A mixture of 20 parts by weight of the product of Example 1 with 80 parts of n-butyl acrylate;

(2) A mixture of 10 parts by weight of the product of Example 2(a) with 70 parts of n-butyl acrylate and 20 parts of methyl methacrylate;

(3) A mixture of 5 parts by weight of the product of Example 7(a) with 10 parts of the product of Example 3 and 85 parts of ethyl acrylate.

The several dispersions are diluted to 12% solids and portions thereof are applied to several wool fabrics in a textile pad. The treated fabrics are dried at 240° F. (ten minutes) and some of them are heated 10 minutes at 300° F. Others are padded through an aqueous solution containing 1% formaldehyde and 1% oxalic acid, dried at 240° F. and heated 10 minutes at 300° F. The fabrics all show marked reduction in shrinkage, those treated with formaldehyde showing generally better results.

All of the examples of our copending application above referred to, namely Examples A through H and 1 through 18 are hereby incorporated by reference to show the preparation of the starting materials of Formula IV hereinabove.

It is to be understood that changes and variations may be made without departing from the spirit and scope of the invention as defined in the appended claims.

We claim:

1. A compound selected from the group consisting of those having the structure of one of Formulas I, II, and III:

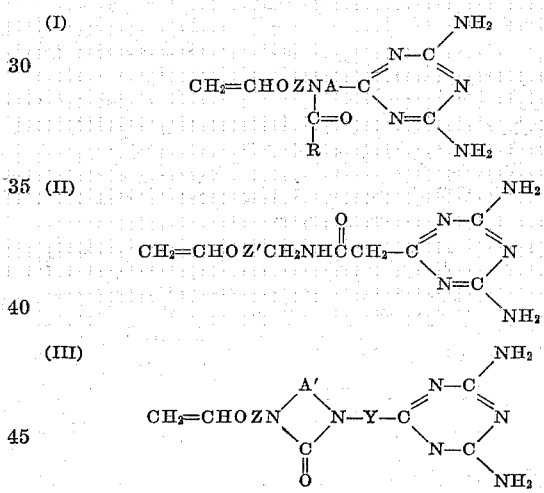

where Z is an alkylene group having 2 to 6 carbon atoms, the oxygen and the nitrogen being attached to different carbons thereof, A is selected from the group consisting of —CH$_2$CH$_2$—, —CH(CH$_3$)CH$_2$—, and —CHR'— where R' is selected from the group consisting of hydrogen and alkyl groups having 1 to 8 carbon atoms, R is selected from the group consisting of H, alkyl groups having 1 to 18 carbon atoms, phenyl, halogenophenyl, and alkyl-substituted phenyl groups having 6 to 10 carbon atoms, benzyloxy, and alkoxy and alkoxyalkyl groups of the formulas R$^3$O— and R$^3$OR$^4$— where R$^3$ is an alkyl group having 1 to 4 carbon atoms and R$^4$ is an alkylene group having 1 to 4 carbon atoms; with the proviso that when R is H, the two carbon atoms in A and Z that are attached directly to the N atom therebetween each carry two hydrogen atoms, Z' is an alkylene group having 1 to 5 carbon atoms, A' is selected from the group consisting of —CH$_2$CH$_2$—, —(CH$_2$)$_3$—, —CH$_2$CH(CH$_3$)—, and —CH(CH$_3$)CH$_2$—, and Y is selected from the group consisting of —CH$_2$CH$_2$—, CH$_2$CH(CH$_3$)—, and —CH(CH$_3$)CH$_2$—.

2. A copolymer of a compound defined in claim 1 with a copolymerizable monoethylenically unsaturated compound.

3. A copolymer of a compound defined in claim 1 with methyl methacrylate.

4. A copolymer of a compound defined in claim 1 with ethyl acrylate.

5. A copolymer of a compound defined in claim 1 with acrylonitrile.

6. β - [N - (β-vinyloxyethyl)-formamido]-propioguanamine.

7. α-[N-(β-vinyloxyethyl)-N-(ethoxycarbonyl)amino]-acetoguanamine.

8. α - [N-ethoxycarbonyl-N-(β-vinyloxyethyl)amino]-isovaleroguanamine.

9. β - [N-(β-vinyloxyethyl)-palmitamido]-propioguanamine.

10. 2 - [N - (β-vinyloxyethyl)-carbamylmethyl]-4,6-diamino-1,3,5-triazine.

11. A copolymer of β-[N-(β-vinyloxyethyl)-formamido]-propioguanamine with a copolymerizable monoethylenically unsaturated compound.

12. A copolymer of α-[N-(β-vinyloxyethyl)-N-(ethoxycarbonyl)amino]-acetoguanamine with a copolymerizable monoethylenically unsaturated compound.

13. A copolymer of α-[N-ethoxycarbonyl-N-(β-vinyloxyethyl)amino]-isovaleroguanamine with a copolymerizable monoethylenically unsaturated compound.

14. A copolymer of β-[N-(β-vinyloxyethyl)-palmitamido]-propioguanamine with a copolymerizable monoethylenically unsaturated compound.

15. A method for producing a compound selected from the group consisting of those having the structure of one of Formulas I, II, and III as defined in claim 1 which comprises reacting at a temperature of about 75° to 120° C., dicyandiamide, in an inert solvent, with a compound selected from the group consisting of those having the structure of one of Formulas IV, V, and VI:

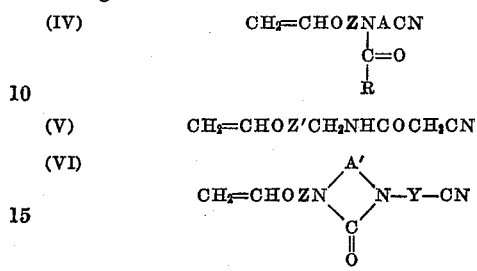

wherein the symbols are as defined in claim 1.

16. A method according to claim 15 in which the reaction is effected in the presence of a basic catalyst.

References Cited in the file of this patent
UNITED STATES PATENTS
2,694,687    De Benneville et al. _____ Nov. 16, 1954

UNITED STATES PATENT OFFICE
Certificate of Correction

August 11, 1959

Patent No. 2,899,406

Peter L. De Benneville et al.

It is hereby certified that error appears in the printed specification of the above numbered patent requiring correction and that the said Letters Patent should read as corrected below.

Column 12, lines 42 to 47, claim 1, Formula III should appear as shown below instead of as in the patent—

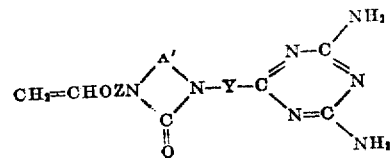

Signed and sealed this 9th day of February 1960.

[SEAL]

Attest:
KARL H. AXLINE,
Attesting Officer.

ROBERT C. WATSON,
Commissioner of Patents.